United States Patent
Rehm et al.

(10) Patent No.: US 8,054,014 B2
(45) Date of Patent: Nov. 8, 2011

(54) CONTROL SYSTEM FOR AN ELECTRICAL MACHINE

(75) Inventors: Lothar Rehm, Herrenberg (DE); Thomas Raumer, Stuttgart (DE)

(73) Assignee: Daimler AG, Stuttgart (DE)

(*) Notice: Subject to any disclaimer, the term of this patent is extended or adjusted under 35 U.S.C. 154(b) by 491 days.

(21) Appl. No.: 12/288,327

(22) Filed: Oct. 17, 2008

(65) Prior Publication Data

US 2009/0099703 A1 Apr. 16, 2009

Related U.S. Application Data

(63) Continuation-in-part of application No. PCT/EP2007/003348, filed on Apr. 17, 2007.

(30) Foreign Application Priority Data

Apr. 19, 2006 (DE) .......................... 10 2006 018 053

(51) Int. Cl.
*H02P 3/00* (2006.01)
*H02P 3/12* (2006.01)
*H02P 3/14* (2006.01)

(52) U.S. Cl. ........ 318/376; 318/375; 318/139; 318/377; 318/802; 318/803; 318/804; 318/806; 318/812; 318/801; 320/132; 320/134; 361/23; 361/74; 361/76; 361/79; 361/84

(58) Field of Classification Search .................. 318/139, 318/434, 376, 377, 802, 803, 804, 806, 812, 318/801; 320/132, 134; 361/78, 79, 74, 84, 23; 903/930

See application file for complete search history.

(56) References Cited

U.S. PATENT DOCUMENTS

| | | | | |
|---|---|---|---|---|
| 5,631,796 A | * | 5/1997 | Yoshihara et al. | 361/79 |
| 5,796,224 A | * | 8/1998 | Hayashi et al. | 318/139 |
| 5,914,582 A | * | 6/1999 | Takamoto et al. | 318/801 |
| 6,239,566 B1 | | 5/2001 | Tareilus et al. | |
| 6,836,085 B2 | * | 12/2004 | Kawada et al. | 318/139 |
| 7,064,513 B2 | * | 6/2006 | Fenley | 318/700 |
| 7,133,602 B2 | * | 11/2006 | Yamada | 388/806 |

* cited by examiner

*Primary Examiner* — Rita Leykin
(74) *Attorney, Agent, or Firm* — Klaus J. Bach

(57) ABSTRACT

In a control system and a method for operating a permanent-magnet electrical machine, when the electrical machine is switched off after one of a functional computer and a monitoring computer of the control system has identified a fault, in order to reduce the braking torque of the electrical machine, which is switched-off but still rotating an output stage of the control system is subjected to a three-phase short circuit if the rotation speed D1 does not fall below a definable limit value GR1 or if a voltage U_DC of the output stage (2) exceeds a limit value Umax, and when the rotation speed D1 is below the definable limit value GR1 and a voltage U_DC of the output stage does not exceed a limit value Umax, all the circuits breakers (2o1, 2o2, 2o3, 2u1, 2u2, 2u3) of the output stage (2) are opened in order to fully disconnect the electrical machine from the output stage.

12 Claims, 2 Drawing Sheets

CONTROL SYSTEM FOR AN ELECTRICAL MACHINE

This is a Continuation-In-Part application of pending international patent application PCT/EP2007/003348 filed Apr. 17, 2007 and claiming the priority of German patent application 10 2006 018 053.4 filed Apr. 19, 2006.

BACKGROUND OF THE INVENTION

The invention relates to a control system for a permanent-magnet electrical machine and a method for controlling a permanent-magnet electrical machine as used, for example, in hybrid drive systems.

DE 102 05 963 A1 discloses a method and control system for controlling a permanent-magnet machine, with each phase of the electrical machine having an associated half-bridge arrangement with a first and a second switching element for supplying power via an intermediate circuit. An operating state of a control system is monitored and compared with a threshold value. When the threshold value is exceeded, a fault state is detected and a short circuit is generated between the phases of the electrical machine.

Permanent-magnet electrical machines are used, for example, as vehicle drive motors which, in the case of hybrid drive systems, receive electrical energy from an energy supply means. Energy is supplied, for example, by a battery which is connected via a converter and an intermediate circuit; in the case of fully electrically operated vehicles energy is supplied by a so-called traction battery or by a generator which is driven by an internal combustion engine.

Because of their design, permanent-magnet electrical machines have the fundamental problem that a counter voltage, which is known as magnet wheel voltage is induced in the armature windings due to the relative movement between the armature windings and the permanent magnets during operation. This induced voltage increases as the rotation speed increases and can reach, and even exceed, the supply voltage of the electric machine. If faults occur in such drive systems with permanent-magnet electrical machines, for example, malfunctions of the control electronics providing for field weakening or a short circuit between the windings, electrical energy will be fed back from the electrical machine to the energy supply means. As a result, a braking torque can be generated in an electric machine which has been shut down but is still rotating. This is very undesirable during operation of a vehicle. Such braking torques can also be generated at low rotation speeds, for example by a three-phase short circuit which is initiated when a fault has been detected.

It is the object of the present invention to reduce the braking torque of an electrical machine which has been shut down but is still rotating.

SUMMARY OF THE INVENTION

In a control system and a method for operating a permanent-magnet electrical machine, when the electrical machine is switched off after one of a functional computer and a monitoring computer of the control system has identified a fault, in order to reduce the braking torque of the electrical machine, which is switched-off but still rotating an output stage of the control system is subjected to a three-phase short circuit if the rotation speed D1 does not fall below a definable limit value GR1 or if a voltage U_DC of the output stage (2) exceeds a limit value Umax, and when the rotation speed D1 is below the definable limit value GR1 and a voltage U_DC of the output stage does not exceed a limit value Umax, all the circuits breakers (2o1, 2o2, 2o3, 2u1, 2u2, 2u3) of the output stage (2) are opened in order to fully disconnect the electrical machine from the output stage.

In this case, the switching elements of the output stage are designated circuit breakers.

The advantage of the solution according to the invention is that a three-phase short circuit is carried out only under boundary conditions in which an interfering braking torque cannot occur. In the case of a three-phase short circuit of a permanent-magnet electrical machine, no appreciable braking torque is generated at relatively high rotation speeds (in the region of above several hundred revolutions per minute). Furthermore, damage to components, such as the battery, converter and its semiconductor components, is avoided.

In one embodiment of the invention, all the circuit breakers of the output stage can be opened, in order to switch off the electrical machine, when the rotation speed D1 is below the limit value GR and a voltage U_DC of the output stage falls below a limit value Umax.

In the case of a three-phase short circuit of a permanent-magnet electrical machine, an interfering braking torque is generated at very low rotation speeds (in the region of less than a few hundred revolutions per minute). However, the electrical machine can be switched off by opening all the circuit breakers of the output stage at relatively low rotation speeds without an interfering braking torque. This has the advantage that the electrical machine can also be switched off without an interfering braking torque when the boundary conditions for carrying out a three-phase short circuit with a low braking torque are not present.

The invention will become more readily apparent from the following description thereof with reference to the accompanying drawings:

DESCRIPTION OF A PARTICULAR EMBODIMENT OF THE INVENTION

Figure 1:
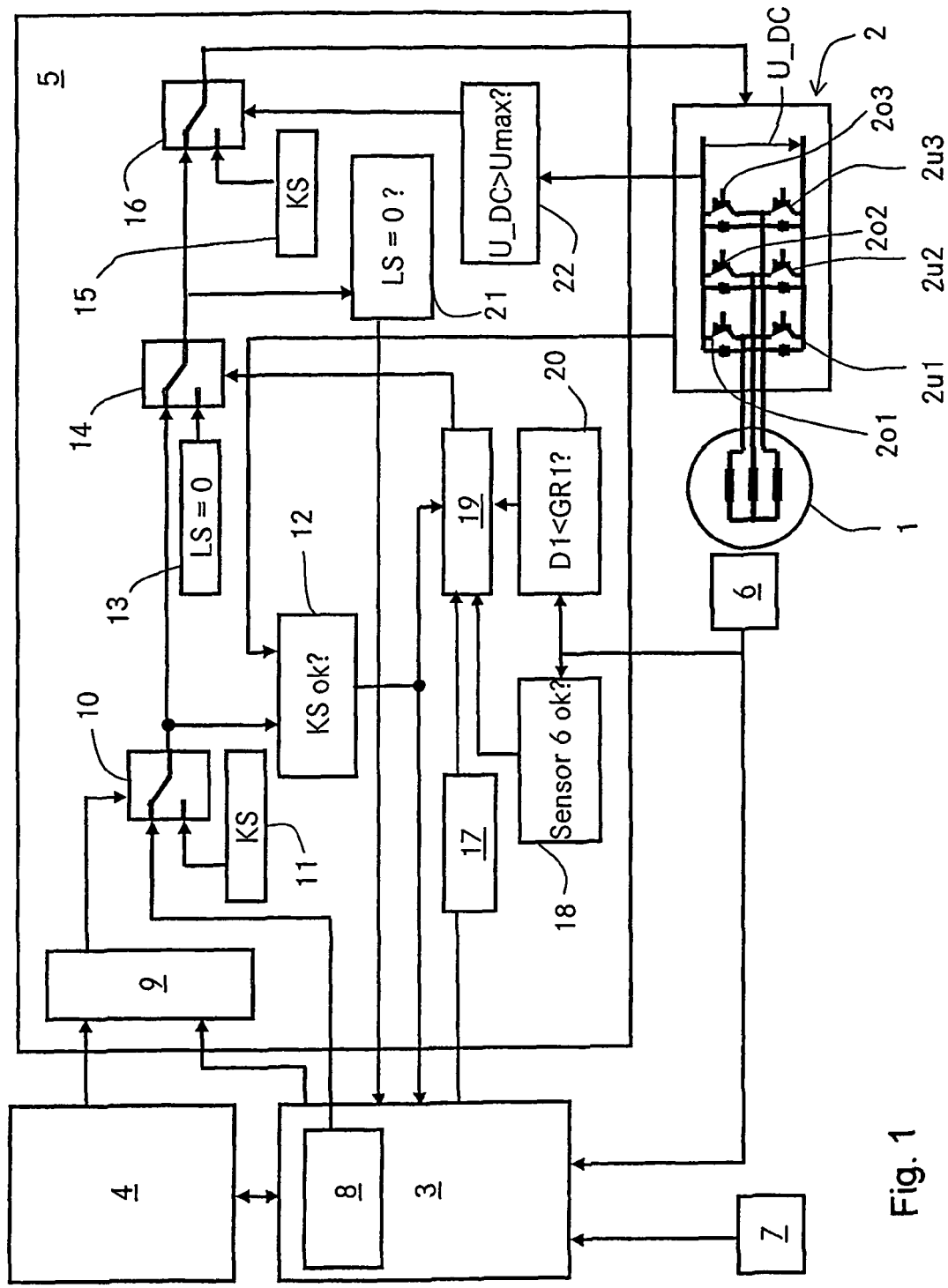
FIG. 1 shows schematically a circuit diagram of a control system according to the invention in conjunction with a permanent-magnet electrical machine.

FIG. 1 shows an electrical machine 1 with a particular control system according to the invention.

The electrical machine 1 is connected to an output stage 2. The output stage 2 may be in the form of an inverter or a converter. The illustrated output stage 2 has three upper switching elements 2o1, 2o2, 2o3 and three lower switching elements 2u1, 2u2, 2u3. The switching elements are typically in the form of circuit breakers. These switching elements form three half-bridge arrangements which are each being formed from two of the switching elements 2o1, 2u1; 2o2, 2u2 and 2o3 2u3; each controlling one of the three phases of the electrical machine 1.

The output stage 2 is connected to a supply device of the electrical machine 1 (for example a battery) (not illustrated in FIG. 1) by means of a main contactor (likewise not illustrated). The supply device supplies a supply voltage U_DC to the output stage 2. The supply device can be switched on and off by means of the main contactor.

The output stage 2 is connected to a logic module 5 and is controlled by this logic module. In addition; the output stage 2 transmits information about the supply voltage U_DC and information about the correct implementation of a three-phase short circuit to the logic module 5. Similarly, information about correct implementation of opening of the switching elements 2$o$1, 2$o$2, 2$o$3, 2$u$1, 2$u$2 or 2$u$3 or about a voltage U_CE of a switching element 2$o$1, 2$o$2, 2$o$3, 2$u$1, 2$u$2 or 2$u$3 can be relayed to the logic module 5.

The logic module 5 is connected to a functional computer 3 and a monitoring computer 4 and receives data from these devices. The functional computer 3 and the monitoring computer 4 are likewise connected to one another and interchange data. In this case, the monitoring computer 4 monitors for fault-free operation of the functional computer 3.

The functional computer 3 receives the information from a rotation speed sensor 6 which preferably detects a rotation speed D1 of the electrical machine 1.

Furthermore, one or more further rotation speed sensors 7 are provided for detecting one or more rotation speeds D2. For example, the rotation speed of the electrical machine 1 can likewise be detected as rotation speed D2. Similarly, a rotation speed of a gear mechanism which is connected to the electrical machine 1, a wheel rotation speed of a vehicle wheel or another relevant rotation speed can be detected. A wheel rotation speed sensor of a vehicle wheel of an electronic stability program is preferably provided as rotation speed sensor 7.

In FIG. 1, the rotation speed sensor 7 is connected to the functional computer 3. The functional computer 3 receives information from the rotation speed sensor 7 about the detected rotation speed D2 via this connection.

The functional computer 3 has a region 8, which is designated a first plane in a twin-plane monitoring system or a three-plane monitoring system. In this case, the first plane is monitored by a second plane and possibly a third plane. The actual control signals for controlling the electrical machine 1 are calculated in the region 8 of the functional computer 3. These control signals are transmitted from the region 8 of the functional computer 3 to a switch 10 of the logic module 5.

The switch 10 of the logic module 5 transmits the control signals to a switch 14 of the logic module 5 via a control line. The switch 14 of the logic module 5 transmits the control signals to a switch 16 of the logic module 5 via a control line. The switch 16 of the logic module 5 transmits the control signals to the output stage 2 via a control line. The output stage 2 adjusts its switching elements 2$o$1, 2$o$2, 2$o$3, 2$u$1, 2$u$2, 2$u$3 according to the control signals and controls the electrical machine 1 in accordance with the control signals.

The functional computer 3 is connected to an element 9 of the logic module 5 via a switch-off path. In this case, a connection via which an enable signal or a switch-off signal can be selectively transmitted is designated a switch-off path.

The monitoring computer 4 is likewise connected to the element 9 of the logic module 5 via a switch-off path.

In one preferred embodiment, the switch-off signal is provided as a no-power default state. If no signal is transmitted from the functional computer 3 or from the monitoring computer 4 to the logic module 5 due to a fault, the logic module 5 interprets this as a switch-off signal.

The element 9 is in the form of a "logical AND" in the embodiment illustrated in FIG. 1. Element 9, like all the elements of the logic module 5, can be represented as an electronic component, as a structure within a logic module or by means of software. If the "logical AND" 9 receives an enable signal both from the functional computer 3 and from the monitoring computer 4, it transmits an enable signal to the switch 10, otherwise it transmits a switch-off signal.

In an alternative embodiment, the element 9 is in the form of a "logical OR" or the like. In this case, the element 9 passes a switch-off signal to the switch 10 when it receives a switch-off signal from the functional computer 3 or from the monitoring computer 4 or from both said computers 3, 4.

If the switch 10 receives a switch-off signal from element 9, it changes over and thus interrupts the process of relaying the control signals calculated by the region 8 of the functional computer 3. Now, the control signals from an element 11 of the logic module 5 are transmitted instead of the control signals from the region 8. In this case, the element 11 is typically a non-volatile memory in which the control signals for a three-phase short circuit are permanently stored.

The control signals from the element 11 are fed to the control line via the switch 10 and transmitted to the output stage 2 via switch 14 and switch 16.

The output stage 2 adjusts its switching elements 2$o$1, 2$o$2, 2$o$3, 2$u$1, 2$u$2, 2$u$3 according to the control signals for a three-phase short circuit and thus generates a three-phase short circuit of the electrical machine 1.

In this case, the control signals can provide a three-phase short circuit of the switching elements 2$o$1, 2$o$2, 2$o$3 or the switching elements 2$u$1, 2$u$2, 2$u$3. Provision may also be made to change to the respectively other variant of a three-phase short circuit when information about the operating state of the switching elements 2$o$1, 2$o$2, 2$o$3, 2$u$1, 2$u$2, 2$u$3 allows the conclusion to be drawn that the selected three-phase short circuit cannot be, or was not, carried out without faults.

The switch 14 is connected to an element 19. The element 19 is a logic device which sends a switch-off signal to the switch 14 when defined input data is present. In this case, the switch-off signal causes the switch 14 to be switched to a switching state in which it can relay associated control signals for opening all the switching elements 2$o$1, 2$o$2, 2$o$3, 2$u$1, 2$u$2, 2$u$3 of the output stage 2 in order to switch-off the electrical machine 1.

The element 19 is connected to the rotation speed sensor 6 via an element 20. The element 20 receives, from the rotation speed sensor 6, information about the rotation speed D1 detected by the rotation speed sensor 6. The rotation speed D1 is preferably a rotation speed of the electrical machine 1. The element 20 checks whether the rotation speed D1 is below a limit value GR1. In one embodiment, the element 20 relays a signal to the element 19 when this is the case.

In a development of this embodiment, a check is made as to whether the rotation speed sensor 6 and the signal transmission means for the value for D1 operate without faults. In FIG. 1, this check is performed in an element 18. In this case, element 19 evaluates the information about the rotation speed D1 from the sensor 6 supplied by element 20 only when the element 18 additionally signals to the element 19 that the rotation speed sensor 6 and the signal transmission means for the value for D1 operate without faults. If this is not the case, in one development, a permanently stored rotation speed value can be adopted as a replacement value.

In the embodiment illustrated in FIG. 1, the element 19 is connected to the functional computer 3 via an element 17. The element 17 receives rotation speed information D2 from an additional sensor 7 from the functional computer 3. In this case, the element 17 can, as an alternative to the embodiment illustrated in FIG. 1, also be arranged in the functional computer 3.

In one development, the element 17 transmits a signal to the element 19 only when the rotation speed information D2 falls below the limit value GR2. In an alternative simplified embodiment, the element 19 relays a signal to the element 14 when this is the case.

In a particular form of this alternative embodiment, the rotation speed information D2 supplied to the functional computer 3 by the additional rotation speed sensor 7 is replaced by the rotation speed information D1 supplied to the functional computer 3 by the rotation speed sensor 6 when the functional computer 3 identifies a fault in the rotation speed sensor 7 or in the data transmission means of the rotation speed sensor 7. In accordance with a preferred embodiment, the element 17 transmits a signal to the element 19 in this case only when the rotation speed information D1 detected in the functional computer 3 falls below the limit value GR1.

In a preferred embodiment, the element 19 transmits a signal to the switch 14 when both elements 17 and 20 identify that a limit value is undershot and no information about faulty detection or transmission of the signals which fall below the limit value is present.

The control signals which are transmitted by the switch 10 to the switch 14 via the control line are also relayed to an evaluation element 12. The element 12 uses the control signals from switch 10 to identify whether a three-phase short circuit should be initiated. The evaluation element 12 transmits this information to the functional computer 3 and to the element 19 of the logic module 5.

The evaluation element 12 is also connected to the output stage 2 and receives from said output stage information about its operating state or the operating state of its switching elements $2o1, 2o2, 2o3, 2u1, 2u2, 2u3$. In this case, it typically transmits information about whether a voltage U_CE of the switching elements $2o1, 2o2, 2o3, 2u1, 2u2, 2u3$ assumes a permissible value. The element 12 uses the information from the output stage 2 to identify whether the output stage 2 generates a three-phase short circuit of the electrical machine 1. If the three-phase short circuit is performed correctly, the element 12 transmits this information to the functional computer 3 and to an element 19 of the logic module 5.

If the three-phase short circuit is performed incorrectly, one embodiment makes provision for the variant of the three-phase short circuit to be changed from shorting of the switching elements $2o1, 2o2, 2o3$ to shorting of the switching elements $2o1, 2o2, 2o3, 2u1, 2u2, 2u3$ or vice versa.

In the embodiment illustrated in FIG. 1, the element 19 sends a switch-off signal to switch 14 if the element 19 receives the information that the functional computer 3 has identified, via the element 17, a rotation speed D2 or D1 below its associated limit value GR2 or GR1 and the element 12 has identified a three-phase short circuit of the output stage 2 and the lack of a switch-off signal from element 9 to switch 10. In this case, it is assumed on the basis of the signals applied to element 19 that the functional computer 3 is operating without faults. Therefore, the signal relayed via the element 17 can be relied on and, when D2 or D1 falls below the limit value GR2 or GR1, the changeover to open switching elements $2o1, 2o2, 2o3, 2u1, 2u2, 2u3$ can be initiated by sending a switch-off signal to switch 14. This behavior can be used to incorporate in the method a switch-off command which is supplied by an external controller and is not based on fault identification of the functional computer 3 or of the monitoring computer 4. It is therefore also possible to initiate a three-phase short circuit or switch-off of the electrical machine by opening all the switching elements $2o1, 2o2, 2o3, 2u1, 2u2, 2u3$ for an external switch-off command as a function of rotation speed and/or as a function of a voltage U_DC.

In the embodiment illustrated in FIG. 1, the element 19 sends a switch-off signal to switch 14 if the element 19 receives information that the element 20 has identified that the rotation speed D1 is below its associated limit value GR1 and the element 12 has identified a three-phase short circuit of the output stage 2 and the application of a switch-off signal from element 9 to switch 10. If a switch-off signal is applied by element 9 to switch 10, the data from the functional computer 3 and from the monitoring computer 4 can no longer be relied on. It is therefore expedient here for the rotation speed signal relayed from the functional computer 3 to the element 17 to not be used, but for the rotation speed signal D1 relayed directly from the sensor 6 to the logic module 5 to be relied on.

In the case described last, the element 18 additionally has to signal to the element 19 that the sensor 6 is operating without faults in the embodiment illustrated in FIG. 1. If this is not the case, a permanently stored rotation speed value can be adopted as a replacement. This also applies when the element 17 is switched to the rotation speed D1 as a replacement and element 18 identifies a fault in the sensor 6.

If the switch 14 receives a switch-off signal from element 19, it changes over and thus interrupts the process of relaying the control signals arriving from element 10. Now, the information from an element 13 of the logic module 5 is relayed instead of these control signals. In this case, the element 13 is typically a non-volatile memory in which the control signals for opening all the switching elements $2o1, 2o2, 2o3, 2u1, 2u2, 2u3$ of the output stage 2 are permanently stored.

The control signals from the element 13 are fed to the control line via the switch 14 and transmitted to the output stage 2 via switch 16. The output stage 2 opens its switching elements $2o1, 2o2, 2o3, 2u1, 2u2, 2u3$ according to the control signals operating parameters supplied to it and thus controls the electrical machine 1.

The information, which is transmitted by the switch 14 to the switch 16 via the control line, is also relayed to an element 21. The element 21 uses the information from switch 14 to identify whether all the switching elements $2o1, 2o2, 2o3, 2u1, 2u2, 2u3$ should be opened. The element 21 relays this information to the functional computer 3.

The output stage 2 transmits information about the voltages U_CE applied to it to an element 22. Element 22 is a comparator which compares the supplied value for the voltage U_CE with a value Umax and relays a switch-off signal to the switch 16 when U_CE is greater than Umax.

If the switch 16 receives a switch-off signal from element 22, it switches over and thus interrupts the transmission of the control signals arriving from the switch element 14. Now, the control signals from an element 15 of the logic module 5 are transmitted instead of the control signals of the element 14. In this case, the element 15 is typically a read-only memory in which the control signals for a three-phase short circuit of the output stage 2 are permanently stored.

Figure 2:
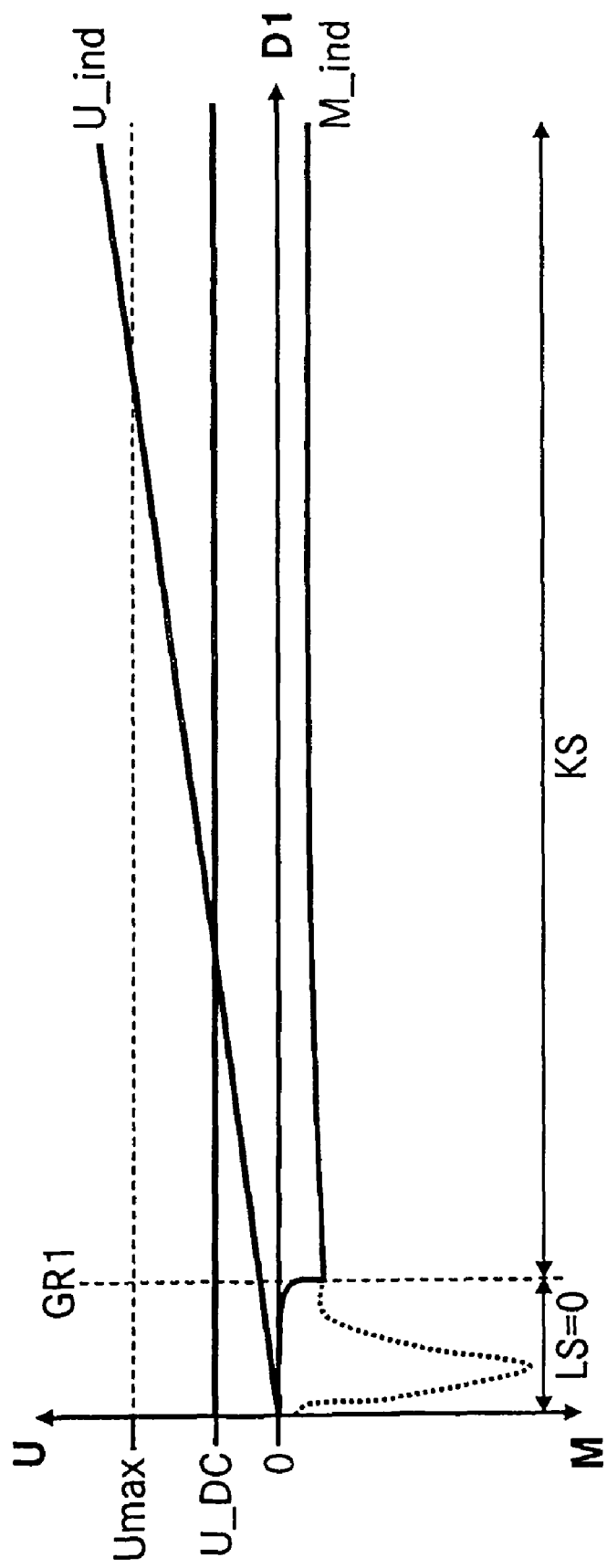
FIG. 2 shows, in an exemplary illustration, a rotation speed-dependent fault reaction and the associated braking torque.

FIG. 2 illustrates, by way of example, the effect of a rotation speed-dependent fault reaction according to the invention on the braking torque.

FIG. 2 schematically shows the profile of the operating voltage U_DC, the induced voltages U_ind and the induced braking torque M_ind of an apparatus according to the invention, in which the main contactor which is arranged between the voltage supply means and the output stage 2 is closed, that is to say the output stage 2 is supplied with a constant voltage U_DC. As can be seen, the induced voltage U_ind increases proportionally to the rotation speed here.

In the example illustrated in FIG. 2, the detection of rotation speed D1 is operating correctly, that is to say the electrical machine 1 is switched off below the rotation speed limit value GR1 by opening all the circuit breakers, starting from the limit rotation speed, by three-phase shorting. The three-phase short circuit induces only a low braking torque at relatively high rotation speeds (>GR1).

At low rotation speeds, a high braking torque is generated in the event of a three-phase short circuit, as indicated by the dotted line. The reason for this is the short-circuit current in the electrical machine 1.

If the electrical machine is switched off by means of open circuit breakers at relatively low rotation speeds (<GR1), the braking torque drops. In this region, the induced voltage is lower than the supply voltage U_DC. There is therefore no current flow from U_ind to U_DC which could generate an appreciable braking torque M_ind. As a result, the limit value GR1 (and accordingly the limit value GR2) is expediently in a rotation speed range in which U_ind is lower than U_DC.

Furthermore, a voltage limit value Umax is provided, and switch-off of the electrical machine 1 is in each case changed over to a three-phase short circuit when said voltage limit value is exceeded. This constitutes protection of the electrical machine against an excessively high supply voltage U_DC. Therefore, the electrical machine 1 and the output stage 2 are protected against an excessively high supply voltage which is generated, possibly inductively, when the voltage supply means is switched off, independently of faulty rotation speed identification.

What is claimed is:

1. A control system for a permanent-magnet electrical machine (1),
having
a functional computer (3),
a monitoring computer (4) in communication with the functional computer (3),
a programmable logic module (5) connected to the functional computer (3) and the monitoring computer (4),
a rotation speed sensor (6) associated with the electrical machine (1) for detecting a rotation speed D1 of the electrical machine (1), and
an output stage (2), which is connected to the programmable logic module (5) and the electrical machine (1) for supplying power thereto and which can be switched off, the output stage (2) having three upper circuit breakers (2$o$1, 2$o$2, 2$o$3) and three lower circuit breakers (2$u$1, 2$u$2, 2$u$3),
for disconnecting the electrical machine (1) when the functional computer (3) or the monitoring computer (4) identifies a fault, and
means for switching off the electrical machine (1) by subjecting the output stage (2) to a three-phase short circuit by shorting one of the three upper circuit breakers (2$o$1, 2$o$2, 2$o$3) and the three lower circuit breakers (2$u$1, 2$u$2, 2$u$3) when the rotation speed D1 does not fall below a definable limit value GR1 or when a voltage U_DC of the output stage (2) exceeds a limit value Umax, and all the circuit breakers (2$o$1, 2$o$2, 2$o$3, 2$u$1, 2$u$2, 2$u$3) of the output stage (2) being openable, in order to fully disconnect the electrical machine (1), when the rotation speed (D1) of the electric machine (1) is below the limit value GR1 and a voltage U_DC of the output stage (2) does not exceed a limit value Umax.

2. The control system as claimed in claim 1, wherein a speed sensor (6) is provided for detecting the speed (D1) of the electrical machine (1) and at least one additional rotation speed sensor (7) is provided for detecting a rotation speed (D2) of another component.

3. A method for controlling a permanent-magnet electrical machine (1), comprising:
a functional computer (3),
a monitoring computer (4) in communication with the functional computer (3),
a programmable logic module (5) connected to the functional computer (3) and the monitoring computer (4),
a rotation speed sensor (6) associated with the electrical machine (1) for detecting a rotation speed D1 of the electrical machine (1), and
an output stage (2), which is connected to the programmable logic module (5) and the electrical machine for supplying power thereto and which can be switched off, the output stage (2) having three upper circuit breakers (201, 2$o$2, 2$o$3) and three lower circuit breakers (2$u$1, 2$u$2, 2$u$3),
for disconnecting the electrical machine (1) when the functional computer (3) or the monitoring computer (4) identifies a fault, and
means for switching off the electrical machine (1) by subjecting the output stage (2) to a three-phase short circuit by shorting the three upper circuit breakers (201, 2$o$2, 2$o$3) or the three lower circuit breakers (2$u$1, 2$u$2, 2$u$3) when the rotation speed D1 does not fall below a definable limit value GR1 or a voltage U_DC of the output stage (2) exceeds a limit value Umax,
the method comprising the steps of switching off the electrical machine (1) when the functional computer (3) identifies a fault in the functional computer (3) or a monitoring computer (4) identifies a fault in the functional computer (3) or in the monitoring computer (4),
monitoring a rotation speed D1 of the electrical machine (1) by a separate logic module (5)
and comparing it with a limit value GR1, and
initiating a three-phase short circuit of the upper circuit breakers (201, 202, 203) or the lower
circuit breakers (2$u$1, 2$u$2 and 2$u$3) when the rotation speed D1 is not below the limit
value GR1,
and opening the upper and the lower current breakers (201, 2$o$2, 2$o$3, 2$u$1, 2$u$2, 2$u$3) when the rotation speed is below the limit value GR1 and a voltage V.DC of the output stage (2) does not exceed a limit value Vmax.

4. The method as claimed in claim 3, wherein the output stage (2) is changed over from a three-phase short circuit to open circuit breakers (201, 2$o$2, 2$o$3, 2$u$1, 2$u$2, 2$u$3) when the rotation speed D1 of the rotation speed sensor (6) falls below the limit value GR1.

5. A method for controlling a permanent-magnet electrical machine (1), comprising:
a functional computer (3),
a monitoring computer (4) arranged so as to be in communication with the functional computer (3),
a programmable logic module (5) connected to the function computer (3) and the monitoring computer (4),
a rotation speed sensor (6) associated with the electrical machine (1) for detecting a rotation speed D1 of the electrical machine (1), and
an output stage (2), which can be switched off, and which is connected to the programmable logic module (5) and to the electrical machine (1) for controlling the power supply thereto, the output stage (2) having three upper circuit breakers (201, 2$o$2, 203) and three lower circuit breakers (2$u$1, 2$u$2, 2$u$3),
for disconnecting the electrical machine (1) when the functional computer (3) or the monitoring computer (4) identifies a fault, and
means for switching off the electrical machine (1), by subjecting the output stage (2) to a three-phase short circuit by shorting the three upper circuit breakers (201, 2$o$2, 2$o$3) or the three lower circuit breakers (2$u$1, 2$u$2, 2$u$3) when the rotation speed D1 of the electric machine (1) does not fall below a definable limit value GR1 or a voltage U_DC of the output stage (2) exceeds a limit value Umax, the method comprising the steps of:

monitoring by the functional computer (3) a rotation speed D2, which is detected by a rotation speed sensor (7) connected to the functional computer (3), and initiating a three-phase short circuit of the circuit breakers (201, 202, 2o3) or the circuit breakers (2u1, 2u2 and 2u3) of the output stage (2) when the rotation speed D2 is not below the limit value GR2 for switching off the electrical machine.

6. The method as claimed in claim 5, wherein the output stage (2) is changed over from a three-phase short circuit to open circuit breakers (201, 202, 2o3, 2u1, 2u2, 2u3) when the rotation speed D2 of the rotation speed sensor (7) falls below the limit value GR2.

7. The method as claimed in claim 5, wherein the output stage (2) is changed over from a three-phase short circuit to open circuit breakers (201, 2o2, 2o3, 2u1, 2u2, 2u3) when it is not possible to evaluate the rotation speed signal D2, and evaluation of the rotation speed D1 of the rotation speed sensor (6) in the functional computer (3) identifies that the limit value GR1 is undershot.

8. The method as claimed in claim 7, wherein the output stage (2) is changed over to a three-phase short circuit when a voltage U_DC of the output stage (2) exceeds a value U_max.

9. The method as claimed in claim 5, wherein switching off of the output stage (2) is terminated when the voltage U_DC of the output stage (2) again falls below the value U_max where switch-off is currently not required.

10. The method as claimed in claim 5, wherein the switching state of the circuit breakers (2o1, 2o2, 2o3, 2u1, 2u2, 2u3) of the output stage (2) is transmitted from the logic module (5) to the functional computer (3).

11. The method as claimed in claim 5, wherein a response as to whether a three-phase short circuit is required and carried out is sent from an element (12) of the logic module (5) to the functional computer (3).

12. The method as claimed in claim 5, wherein when the electrical machine (1) is started, a switch-off path test is carried out, in which the correct switch-off and the change in the switch-off path are tested at different rotation speeds.

* * * * *